United States Patent
Lin et al.

(10) Patent No.: US 8,953,570 B2
(45) Date of Patent: Feb. 10, 2015

(54) RADIO FREQUENCY IDENTIFICATION SYSTEM AND RELATED OPERATING METHODS

(75) Inventors: Lang Lin, Potomac, MD (US); Chandrashekhara Harischandra, Bangalore (IN); Deepak Khade, Sankeshwar (IN)

(73) Assignee: Symbol Technologies, Inc., Holtsville, NY (US)

( * ) Notice: Subject to any disclaimer, the term of this patent is extended or adjusted under 35 U.S.C. 154(b) by 833 days.

(21) Appl. No.: 12/953,078

(22) Filed: Nov. 23, 2010

(65) Prior Publication Data
US 2012/0127976 A1    May 24, 2012

(51) Int. Cl.
| | |
|---|---|
| H04L 12/28 | (2006.01) |
| H04W 4/00 | (2009.01) |
| H04B 7/00 | (2006.01) |
| G01S 13/87 | (2006.01) |
| G01S 13/82 | (2006.01) |
| G06K 17/00 | (2006.01) |

(52) U.S. Cl.
CPC .......... *G06K 17/0022* (2013.01); *G01S 13/878* (2013.01); *G01S 13/82* (2013.01); *G06K 2017/0045* (2013.01)
USPC .......... 370/338; 370/312; 370/352; 340/5.74; 340/10.1; 340/13.26; 340/539.13; 340/572.1; 455/41.2

(58) Field of Classification Search
CPC ... G06Q 20/3278; H04W 4/008; H04W 4/02; G01S 13/82; G01S 13/878; G06K 17/0022
USPC .................................................. 370/228–356
See application file for complete search history.

(56) References Cited

U.S. PATENT DOCUMENTS

| | | | |
|---|---|---|---|
| 6,184,847 B1 | 2/2001 | Fateh et al. | |
| 6,570,487 B1 * | 5/2003 | Steeves | 340/5.2 |

(Continued)

FOREIGN PATENT DOCUMENTS

| | | |
|---|---|---|
| JP | 2008236651 A | 10/2008 |
| WO | 2006119563 A1 | 11/2006 |
| WO | 2009013646 A2 | 1/2009 |

OTHER PUBLICATIONS

PCT International Search Report Dated Feb. 6, 2012 for Counterpart Application PCT/US2011/058345.

(Continued)

*Primary Examiner* — Venkatesh Haliyur

(57) ABSTRACT

A method of operating a radio frequency identification (RFID) system is provided. The method interrogates RFID tags with an RFID reader and provides at least some of the collected tag data to a mobile device that is unable to communicate with RFID tags using the over-the-air interface. In some situations, the RFID system obtains the current location of the mobile device and determines the location of a target tag relative to the current location of the mobile device. Locating the target tag in this manner involves the interrogation of a reference tag located at the mobile device, along with the target tag, using one RFID reader. The position of the target tag relative to the reference tag is calculated in response to the tag response signals obtained from the target and reference tags. Moreover, location of the target tag can be independently determined relative to the location of a mobile reader, by using a reference tag attached to a fixed reader or to the mobile reader.

15 Claims, 8 Drawing Sheets

(56) References Cited

U.S. PATENT DOCUMENTS

| | | | |
|---|---|---|---|
| 6,842,106 B2* | 1/2005 | Hughes et al. ............... 340/5.8 |
| 6,842,774 B1 | 1/2005 | Piccioni |
| 7,128,270 B2* | 10/2006 | Silverbrook et al. .... 235/472.01 |
| 7,142,120 B2 | 11/2006 | Charych et al. |
| 7,195,173 B2* | 3/2007 | Powell et al. ............... 235/492 |
| 7,221,269 B2 | 5/2007 | Onderko et al. |
| 7,274,909 B2* | 9/2007 | Perttila et al. ............... 455/41.2 |
| 7,315,522 B2* | 1/2008 | Wood, Jr. .................. 370/312 |
| 7,327,251 B2* | 2/2008 | Corbett, Jr. ............ 340/539.13 |
| 7,412,898 B1* | 8/2008 | Smith et al. ................. 73/761 |
| 7,497,384 B2* | 3/2009 | Powell et al. ............... 235/492 |
| 7,554,447 B2* | 6/2009 | Cox ......................... 340/572.1 |
| 7,580,678 B2* | 8/2009 | Byman-Kivivuori et al. ............... 455/41.2 |
| 7,606,533 B2* | 10/2009 | Perttila et al. ............... 455/41.2 |
| 7,625,314 B2* | 12/2009 | Ungari et al. .................. 482/1 |
| 7,650,017 B2 | 1/2010 | Yamada |
| 7,650,095 B2* | 1/2010 | Fuqua et al. ................. 399/80 |
| 7,652,577 B1 | 1/2010 | Madhow et al. |
| 7,658,694 B2* | 2/2010 | Ungari ....................... 482/1 |
| 7,667,572 B2* | 2/2010 | Husak et al. ................. 340/10.1 |
| 7,667,575 B2* | 2/2010 | Husak et al. ................. 340/10.2 |
| 7,692,532 B2* | 4/2010 | Fischer et al. ................. 340/10.2 |
| 7,755,469 B2* | 7/2010 | Sung et al. ................. 340/10.1 |
| 7,760,095 B2* | 7/2010 | Murrah ................... 340/572.1 |
| 7,817,014 B2* | 10/2010 | Krishna et al. .............. 340/10.4 |
| 7,873,326 B2* | 1/2011 | Sadr ......................... 455/67.16 |
| 7,878,945 B2* | 2/2011 | Ungari et al. .................. 482/1 |
| 7,887,459 B2* | 2/2011 | Ungari et al. .................. 482/1 |
| 7,917,594 B2* | 3/2011 | Reding et al. ............... 709/207 |
| 7,920,827 B2* | 4/2011 | Huomo et al. ............... 455/41.1 |
| 7,928,844 B2* | 4/2011 | Mackenzie et al. ........ 340/572.1 |
| 7,961,098 B2* | 6/2011 | Kanagala et al. .......... 340/572.1 |
| 7,991,644 B2* | 8/2011 | Bryant et al. ............... 705/26.1 |
| 8,135,354 B2* | 3/2012 | Duron et al. ............... 455/67.11 |
| 8,159,329 B1* | 4/2012 | Killian et al. ............... 340/8.1 |
| 8,174,365 B2* | 5/2012 | Akiyama et al. ............. 340/10.2 |
| 8,279,112 B2* | 10/2012 | Carrick ........................ 342/127 |
| 8,425,313 B2* | 4/2013 | Nelson et al. ............... 463/29 |
| 8,430,749 B2* | 4/2013 | Nelson et al. ............... 463/29 |
| 8,446,254 B2* | 5/2013 | Carrick et al. ............... 340/10.1 |
| 8,477,013 B2* | 7/2013 | Sarma et al. ................ 340/8.1 |
| 8,519,823 B2* | 8/2013 | Rinkes ...................... 340/7.32 |
| 8,674,810 B2* | 3/2014 | Uysal et al. ................. 340/10.4 |
| 2004/0002305 A1* | 1/2004 | Byman-Kivivuori et al. ............... 455/41.2 |
| 2004/0066278 A1* | 4/2004 | Hughes et al. ............... 340/10.1 |
| 2004/0087273 A1* | 5/2004 | Perttila et al. ............... 455/41.2 |
| 2004/0134984 A1* | 7/2004 | Powell et al. ............... 235/451 |
| 2004/0190092 A1* | 9/2004 | Silverbrook et al. ......... 358/539 |
| 2004/0203944 A1* | 10/2004 | Huomo et al. ............... 455/41.2 |
| 2004/0243519 A1* | 12/2004 | Perttila et al. ............... 705/75 |
| 2004/0266481 A1 | 12/2004 | Patel et al. |
| 2005/0113138 A1 | 5/2005 | Mendolia et al. |
| 2006/0022800 A1* | 2/2006 | Krishna et al. ............... 340/10.2 |
| 2006/0022801 A1* | 2/2006 | Husak et al. ............... 340/10.5 |
| 2006/0022815 A1* | 2/2006 | Fischer et al. ................. 340/505 |
| 2006/0044112 A1 | 3/2006 | Bridgelall |
| 2006/0052109 A1 | 3/2006 | Ashman, Jr. et al. |
| 2006/0065731 A1* | 3/2006 | Powell et al. ............... 235/451 |
| 2006/0128408 A1* | 6/2006 | Perttila et al. ............... 455/466 |
| 2006/0170565 A1* | 8/2006 | Husak et al. ............... 340/825.49 |
| 2006/0206582 A1* | 9/2006 | Finn .......................... 709/217 |
| 2006/0238353 A1* | 10/2006 | Cox ......................... 340/572.7 |
| 2007/0069851 A1* | 3/2007 | Sung et al. ................... 340/5.1 |
| 2007/0096909 A1 | 5/2007 | Lally |
| 2007/0117623 A1* | 5/2007 | Nelson et al. ............... 463/29 |
| 2007/0194945 A1* | 8/2007 | Atkinson ................ 340/825.72 |
| 2007/0200712 A1* | 8/2007 | Arneson et al. ............... 340/572.8 |
| 2007/0236335 A1* | 10/2007 | Aiouaz et al. ............... 340/10.32 |
| 2007/0271113 A1* | 11/2007 | Nelson et al. ............... 705/1 |
| 2008/0012689 A1* | 1/2008 | Liu et al. .................... 340/10.1 |
| 2008/0100439 A1* | 5/2008 | Rinkes ...................... 340/572.1 |
| 2008/0136681 A1 | 6/2008 | Jeong et al. |
| 2008/0143532 A1* | 6/2008 | Murrah .................... 340/572.4 |
| 2008/0191845 A1* | 8/2008 | Strzelczyk .................. 340/10.5 |
| 2008/0198001 A1* | 8/2008 | Sarma et al. ............... 340/539.1 |
| 2008/0224825 A1* | 9/2008 | Nystrom et al. ............. 340/10.1 |
| 2008/0243853 A1* | 10/2008 | Reding et al. .................. 707/9 |
| 2008/0269016 A1* | 10/2008 | Ungari et al. ................... 482/1 |
| 2008/0269017 A1* | 10/2008 | Ungari .......................... 482/4 |
| 2009/0009332 A1* | 1/2009 | Nunez et al. ............... 340/572.1 |
| 2009/0051485 A1* | 2/2009 | Corry et al. ................... 340/5.8 |
| 2009/0058606 A1 | 3/2009 | Munch et al. |
| 2009/0058638 A1* | 3/2009 | Kanagala et al. ........ 340/539.13 |
| 2009/0058820 A1 | 3/2009 | Hinckley |
| 2009/0079565 A1* | 3/2009 | Mackenzie et al. ........ 340/568.1 |
| 2009/0079571 A1 | 3/2009 | Calvarese |
| 2009/9079571 | 3/2009 | Calvarese |
| 2009/0121026 A1 | 5/2009 | Druker et al. |
| 2009/0222149 A1 | 9/2009 | Murray et al. |
| 2009/0237223 A1* | 9/2009 | Zimmerman et al. ..... 340/10.51 |
| 2009/0243969 A1 | 10/2009 | Matsubara et al. |
| 2009/0322489 A1 | 12/2009 | Jones et al. |
| 2010/0007496 A1* | 1/2010 | Orlassino .................. 340/572.1 |
| 2010/0035724 A1* | 2/2010 | Ungari et al. .................. 482/4 |
| 2010/0039237 A1* | 2/2010 | Radhakrishnan et al. ... 340/10.4 |
| 2010/0041517 A1* | 2/2010 | Ungari et al. .................. 482/8 |
| 2010/0109844 A1* | 5/2010 | Carrick et al. ............... 340/10.1 |
| 2010/0109903 A1* | 5/2010 | Carrick ..................... 340/825.49 |
| 2010/0127875 A1* | 5/2010 | Wong ......................... 340/572.7 |
| 2010/0205541 A1* | 8/2010 | Rapaport et al. ............... 715/753 |
| 2010/0207738 A1 | 8/2010 | Bloy |
| 2010/0211431 A1* | 8/2010 | Lutnick et al. ................ 705/10 |
| 2010/0271187 A1* | 10/2010 | Uysal et al. .................. 340/10.4 |
| 2010/0304684 A1* | 12/2010 | Duron et al. ............... 455/67.11 |
| 2011/0043373 A1* | 2/2011 | Best et al. ................. 340/825.49 |
| 2011/0084811 A1* | 4/2011 | Park et al. .................. 340/10.1 |
| 2011/0102149 A1 | 5/2011 | Lin et al. |
| 2011/0109452 A9* | 5/2011 | Kanagala et al. ........ 340/539.13 |
| 2011/0200023 A1* | 8/2011 | Murray et al. ................ 370/338 |
| 2011/0285502 A1* | 11/2011 | Steinmetz et al. ........... 340/5.61 |
| 2012/0094683 A1* | 4/2012 | Yoeli ......................... 455/456.1 |
| 2012/0119883 A1* | 5/2012 | Bekritsky ..................... 340/10.4 |
| 2012/0127976 A1* | 5/2012 | Lin et al. ..................... 370/338 |

OTHER PUBLICATIONS

Johnny Chung Lee, "Head Tracking for Desktop VR Displays using the WiiRemote", Dec. 21, 2007, [retrieved on Oct. 29, 2009]; Retrieved from Internet: <URL: http://www.youtube.com/watch?v=Jd3-eiid-Uw>.

PCT International Search Report Dated Feb. 2, 2011 for Related Application PCT/US2010/052129.

Office Action Dated Mar. 1, 2012 for Related U.S. Appl. No. 12/609,423.

International Preliminary Report on Patentability and Written Opinion for related counterpart International Patent Application No. PCT/US2010/052129 issued on May 1, 2012.

International Preliminary Report on Patentability and Written Opinion for counterpart International Patent Application No. PCT/US2010/058345 issued on Jun. 5, 2012.

US Office Action Dated Nov. 13, 2012 for Related U.S. Appl. No. 12/609,423.

Non Final Office Action mailed Oct. 24, 2013 in U.S. Appl. No. 12/609,423, Lang Lin, filed Oct. 30, 2009.

Notice of Allowance mailed on Feb. 3, 2014 in U.S. Appl. No. 12/609,423, Lang Lin, filed Oct. 30, 2009.

Notice of Allowance mailed on Apr. 4, 2014 in U.S. Appl. No. 12/609,423, Lang Lin, filed Oct. 30, 2009.

Notice of Allowance mailed on May 29, 2014 in U.S. Appl. No. 12/609,423, Lang Lin, filed Oct. 30, 2009.

* cited by examiner

RADIO FREQUENCY IDENTIFICATION SYSTEM AND RELATED OPERATING METHODS

TECHNICAL FIELD

Embodiments of the subject matter described herein relate generally to radio frequency identification (RFID). More particularly, embodiments of the subject matter relate to techniques and technologies for providing RFID services to a mobile device.

BACKGROUND

RFID systems and their basic operating principles are well known. RFID systems employ fixed (stationary) RFID readers and/or portable RFID readers, both of which can be used to interrogate RFID tags associated with products, containers, or any items of interest. Although mobile RFID readers have been deployed, such mobile devices consume a substantial amount of power due to RFID radio operations.

The prior art is replete with various types of mobile devices that lack RFID interrogation capabilities. Such mobile devices include cellular telephones, netbook and laptop computers, digital media players, and the like. Many of these mobile devices have wireless data communication capabilities (e.g., wireless local area network compatibility, BLUETOOTH short range wireless data communication compatibility, cellular network access, etc.). In addition, some mobile devices are provided with native global positioning system technology, accelerometers, navigation technology, and a variety of useful software applications.

It would be convenient and useful to be able to use a common mobile device (such as a cellular telephone) as a "virtual" RFID reader, even though it lacks the native ability to communicate with RFID tags using the traditional RFID oven-the-air interface. In addition, it would be convenient to be able to use a common mobile device as a navigation or guidance instrument to find a particular RFID tag of interest. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
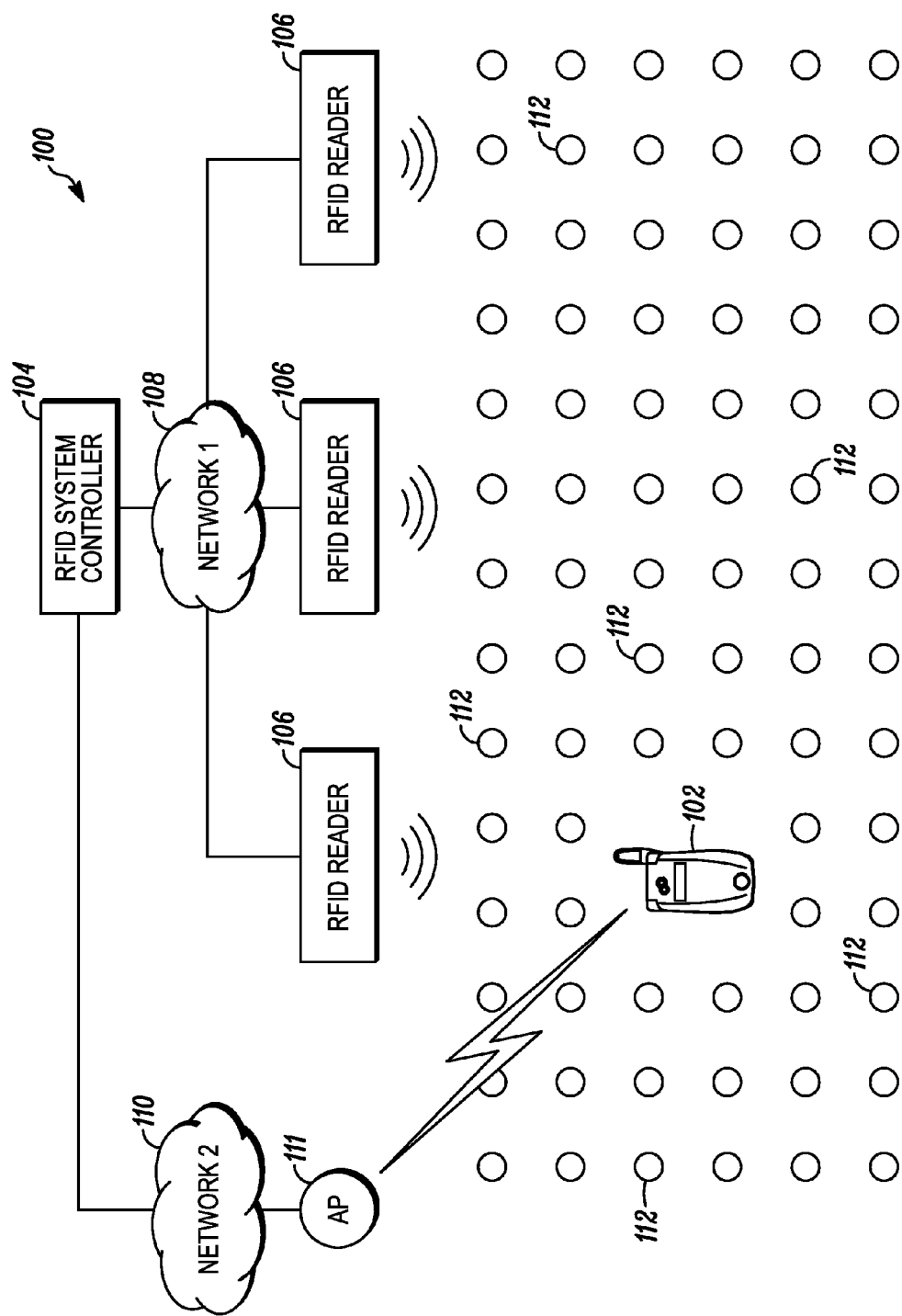
FIG. 1 is a schematic representation of an exemplary RFID system that supports mobile devices.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Moreover, for the sake of brevity, conventional aspects of RFID system components, RFID tags, mobile devices, data communication, processing of RFID tag data, and other aspects of the systems (and the individual operating components of the systems) may not be described in detail herein.

The subject matter presented here relates to an RFID system at accommodates mobile devices, including those that are unable to communicate with RFID tags using the RFID over-the-air interface (which is used by traditional RFID reader devices). An ordinary mobile device can be used as a "virtual" RFID reader in this context by offloading the RFID tag reading tasks to the RFID system backbone, which then sends the collected tag data to the mobile device in an appropriate manner. The tag data can then be presented to the user of the mobile device. For example, the tag data and/or information linked to or otherwise associated with the tag data can be displayed at the mobile device in a manner that emulates the display of a traditional RFID reader. In practice, the mobile device could request certain RFID operations by communicating with one or more RFID readers and/or with an RFID system controller, either directly or indirectly. In certain implementations, the mobile device communicates with RFID readers and/or with an RIM system controller via infrastructure devices of a wireless local area network (WLAN), e.g., a wireless access device. In some deployments, the mobile device communicates with RFID readers and/or with an RFID system controller using an "external" data communication network such as a cellular network, a satellite network, a local area network (LAN), a wide area network (WAN), the Internet, or the like. This arrangement enables the RFID system to receive activation or tag interrogation requests from the mobile device and send tag data back to the mobile device in a quick, convenient, and efficient manner.

A mobile device, including one that lacks inherent RFID over-the-air interface or RFID tag locationing capabilities, may also be utilized to accurately locate a particular RFID tag of interest. In contrast to traditional tag locating approaches that require two or more interrogating RFID readers, the techniques and technologies presented here can be implemented to locate a target RFID tag using only one RFID reader (that cooperates with a mobile device). As described in more detail below, this tag locating technique relies on a reference or "dummy" RFID tag attached to, incorporated within, or otherwise co-located with the mobile device. In operation, a designated RFID reader is activated to interrogate both the target RFID tag and the reference RFID tag. The received tag response signals are then analyzed to calculate the position of the target RFID tag relative to the reference RFID tag (and, consequently, relative to the mobile device). Thereafter, the mobile device is provided with the position of the target RFID tag so that the position can be displayed or otherwise indicated to the user of the mobile device. In certain embodiments, the mobile device can provide navigation instructions or guidance to help the user find the target RFID tag.

Referring now to the figures, a schematic representation of an exemplary RFID system 100 is shown in FIG. 1. The RED system 100 supports at least one mobile device 102. In certain scenarios, the mobile device is unable to communicate with RFID tags using the RFID over-the-air interface. This particular embodiment of the RFID system 100 includes, without limitation: an RFID system controller 104; one or more RFID readers 106 operatively coupled to the RFID system controller 104; a first network architecture 108 operatively coupled to the RFID system controller 104; and a second network architecture 110 operatively coupled to the RFID system controller 104. Although not always required, the illustrated embodiment of the second network architecture 110 includes one or more wireless local area network (WLAN) infrastructure devices, such as an access point device 111. FIG. 1 also depicts RFID tags 112 as small circles within the interrogation field of the RFID readers 106. The RFID system 100 may be deployed in any area or location in which RFID reader coverage is desired. For example, the RFID system 100 may be deployed in a warehouse environment, a storage depot environment, a store front, a supermarket, or the like.

The RFID system controller 104 is deployed when centralized control and management of the RFID readers 106 is desired. It should be appreciated that the RFID system controller 104 could be realized as a standalone hardware device, as a software application running on a computer device, as a processing module or other logical construct integrated with a system component having additional functionality, or the like. For this particular embodiment, the RFID system controller 104 is coupled to (and communicates with) the RFID readers 106 via the first network architecture 108. Additionally or alternatively, the RFID system controller 104 could communicate with the RFID readers 106 via the second network architecture 110.

When deployed, the RFID system controller 104 may be utilized to control the operation of the RFID readers 106, to perform centralized collection and processing of RFID tag response signals, to manage data communication between the components of the RFID system 100, to manage data communication between the RFID system 100 and devices or system external to the RFID system 100, and/or to manage data communication between the RFID system 100 and the mobile device 102. As described in more detail below, the RFID system controller 104 can perform the following functions and operations, without limitation: receive service requests from mobile devices; translate service requests into commands; dispatch commands to RFID readers; receive tag data from RFID readers; filter received tag data (if needed or desired); and dispatch tag data (which may be filtered) to mobile devices. Of course, the RFID system controller 104 could be suitably configured to perform other functions as needed for the particular system application. The RFID system controller 104 could be implemented as a standalone piece of hardware in a network, or its functionality could be incorporated into any suitable component or device, such as an RFID switch device, a network server component, or the like.

The RFID system controller 104 may be suitably configured and designed to support wireless and/or wired data communication with the RFID readers 106, the access point device 111, the first network architecture 108, the second network architecture 110, and/or the mobile device 102. In this regard, the RFID system controller 104 may support one or more of the following wireless data communication techniques, protocols, and methodologies, without limitation: IrDA (infrared); BLUETOOTH; ZIGBEE (and other variants of the IEEE 802.15 protocol); IEEE 802.11 (any variation); IEEE 802.16 (WiMAX or any other variation); cellular/wireless/cordless telecommunication protocols; satellite data communication protocols; wireless hospital or health care facility network protocols such as those operating in the WMTS bands; and proprietary wireless data communication protocols. Moreover, the RFID system controller 104 may support one or more of the following traditional (non-wireless) data communication techniques, protocols, and methodologies, without limitation: Ethernet; home network communication protocols; USB; IEEE 1394 (Firewire); hospital network communication protocols; and proprietary data communication protocols.

FIG. 1 depicts the RFID system controller 104 as a distinct and separate component within the RFID system 100. Alternatively, the functionality of the RFID system controller 104 could be incorporated into one or more of the RFID readers 106, into the access point device 111, or distributed among a plurality of different components within the RFID system 100. In other words, an RFID reader (or any other component or device in the RFID system 100) could function in place of the RFID system controller 104, which may be desirable to reduce equipment cost and to simplify the system architecture. Thus, an implementation of the RFID system 100 could rely on decentralized control and management of the RFID readers 106, which could be designed and configured with enhanced functionality and processing intelligence.

The RFID readers 106 generate RFID interrogation signals and receive RFID tag response signals from RFID tags that are located within interrogation range. In this regard, the RFID readers 106 may leverage well known and conventional RFID techniques and technologies related to the generation of RFID interrogation signals and to the receipt, interpretation, and processing of RFID tag response signals. As is well understood, the RFID readers 106 utilize the traditional RFID over-the-air interface to interrogate tags and to receive tag response signals. For the embodiment depicted in FIG. 1, the RFID readers 106 send the received tag data to the RFID system controller 104 for centralized processing and handling.

An RFID reader 106 in the RFID system 100 could be a "fixed" or stationary device, or a mobile and portable device. A fixed RFID reader 106 would typically be connected to the RFID system controller 104 using a network cable or other tangible data communication link. On the other hand, a mobile RFID reader 106 could communicate with the RFID system controller 104 using a wireless data communication link, a tangible interface cable, a network cable, a data communication cradle, or the like. Indeed, depending upon the particular implementation, one or more of the RFID readers 106 could be suitably configured to support wireless anchor wired data communication with the mobile device 102, the wireless access point device 111, the RFID system controller 104, and/or the first network architecture 108. In practice, an RFID reader 106 could use any of the wireless and/or wired data communication techniques, protocols, and technologies mentioned above for the RFID system controller 104.

The first and second network architectures 108, 110 can be realized using any number of physical, virtual, or logical components, including hardware, software, firmware, and/or processing logic configured to support data communication between an originating component and a destination component, where data communication is carried out in accordance with one or more designated communication protocols over one or more designated communication media. For example, the network architectures 108, 110 may include or cooperate with, without limitation: a computer network such as a local area network (LAN) or a wide area network (WAN); a cellular telecommunication network; an 802.11 network (WLAN); an 802.16 network (WiMAX); the Internet; a hospital data communication network (WMTS or other); a control network; the public switched telephone network; a satellite communication network; or the like. In practice, network communications involving a component or an element of the RFID system 100 may be routed using two or more different types of data communication networks using known or proprietary network interfacing techniques.

Although FIG. 1 depicts two separate network architectures 108, 110, an embodiment of the RFID system 100 could utilize a single network architecture if so desired. FIG. 1 illustrates one implementation where the first network architecture 108 could represent an intranet and where the second network architecture 110 could represent a public network. Alternatively, these two network architectures could be one and the same. Moreover, either the first network architecture 108 or the second network architecture 110 could be implemented as a set of networks arranged in a hierarchical manner. For example, the second network architecture 110 could include a plurality of different networks, such as an intranet LAN and a 3G wireless network. As another example, the first network architecture could be realized as a LAN having multiple levels.

The wireless access point device 111 is suitably configured to support traditional operations in a WLAN environment. Accordingly, the wireless access point device 111 may be compatible with IEEE Specification 802.11 (any variation) for purposes of wireless communication with the mobile device 102. Wireless access points and 802.11 networks are well known and, therefore, conventional aspects and conventional operating functions of the wireless access point device 111 will not be described in detail here. For the example described here, it is assumed that the wireless access point device 111 is coupled to the second network architecture 110. Alternatively, in an optional arrangement, the wireless access point device 111 is coupled to the RFID system controller 104 via the first network architecture 108. In certain implementations, the wireless access point device 111 is coupled to both the first network architecture 108 and the second network architecture 110.

The mobile device 102 may be realized as any handheld, portable, or wireless device having any suitable form factor. For example, and without limitation, the mobile device 102 could be implemented as: a cellular telephone; a smartphone; a personal digital assistant; a portable video game device; a digital music player; a laptop, palmtop, tablet, or netbook computer; an electronic book device; a portable medical device; or a remote control device. In certain deployments, the mobile device 102 is unable to communicate with RFID tags using the traditional RFID over-the-air interface. In this regard, the mobile device 102 might be unable to interrogate RFID tags using the RFID over-the-air interface, and/or might be unable to receive RFID tag response signals using the RFID over-the-air interface. In other words, absent any modifications or add-on features, the mobile device 102 may lack the inherent capability to emit over-the-air RFID interrogation signals, and/or the inherent capability to receive over-the-air RFID tag response signals that are generated in response to RFID interrogation signals.

The mobile device 102 is suitably configured to support one or more non-RFID wireless data communication techniques, protocols, and technologies. A typical embodiment will support one or more cellular telephony standards (such as 3G) and one or more WLAN protocols (such as IEEE 802.11). In practice, however, the mobile device 102 could support any of the non-RFID wireless data communication techniques described above for the RFID system controller 104. Moreover, the mobile device 102 could be designed to accommodate data communication using a tangible cable, a network interface, a cradle or a docking station, or the like.

Figure 2:
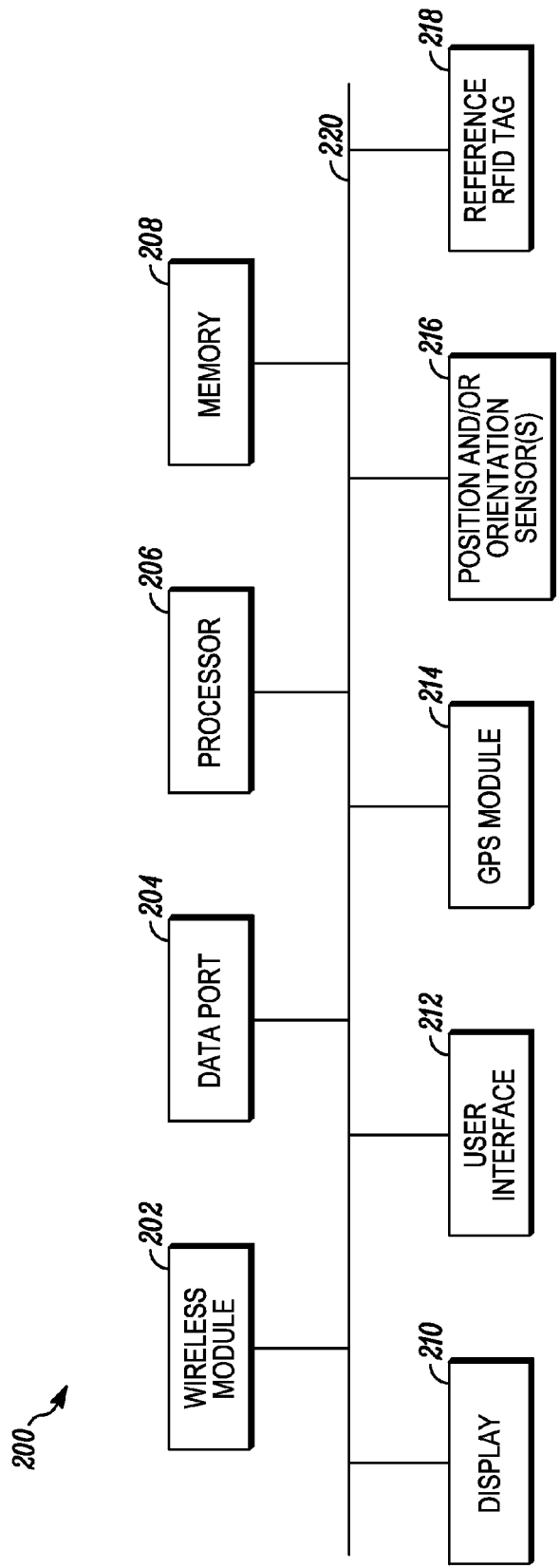
FIG. 2 is a schematic representation of an exemplary mobile device that is suitable for use in the RFID system depicted in FIG. 1.

FIG. 2 is a schematic representation of an exemplary mobile device 200 that is suitable for use in the RFID system 100. Accordingly, the mobile device 102 may employ some or all of the generalized architecture, features, and functionality of the mobile device 200. For this example, the mobile device 200 generally includes, without limitation: a wireless module 202; a data port 204; at least one processor 206; a suitable amount of memory 208; a display 210; and a user interface 212. In certain embodiments that support tag locating methodologies, the mobile device 200 also includes or cooperate with one or more of the following elements: a global positioning system (GPS) module 214; one or more position and/or orientation sensors 216; and a reference RFID tag 218. Of course, a practical implementation of the mobile device 200 will include other components and elements designed to carry out conventional operations that are unrelated to the described subject matter. The elements of the mobile device 200 are coupled together as needed by a suitably configured interconnect architecture 220 that accommodates data transfer, control/command signals, supply voltages, etc.

The wireless module 202 is suitably configured to support wireless data communication operations performed by the mobile device 200. For example, the wireless module 202 may cooperate with the wireless access point device 111 described above with reference to FIG. 1. Moreover, the wireless module 202 may be compatible with a cellular telephone network for purposes of supporting cellular telephony. In practice, the wireless module 202 can be designed and configured to support any of the wireless data communication protocols, techniques, and methodologies mentioned above for the RFID system controller. In an embodiment of the mobile device 200, the wireless module 202 may include or be realized as hardware, software, and/or firmware, such as an RF front end, a suitably configured radio module (which may be a standalone module or integrated with other or all functions of the mobile device 200), a wireless transmitter, a wireless receiver, a wireless transceiver, an infrared sensor, an electromagnetic transducer, or the like. Moreover, the mobile device 200 may include one or more antenna arrangements that cooperate with the wireless module 202. Notably, the wireless module 202 might be RFID-limited in the sense that it might lack at least some hardware, firmware, software, or processing intelligence that is needed to support communication (interrogation and/or receive) with RFID tags using the RFID over-the-air interface.

As mentioned above, the mobile device 200 could be configured to support data communication using non-wireless techniques. In this regard, the mobile device 200 may include or cooperate with appropriate hardware, such as a suitably configured and formatted data port, connector, jack, plug, receptacle, socket, adaptor, or the like. The data port 204 depicted in FIG. 2 is intended to represent any of these physical interface components. In one exemplary deployment, it may be possible for a user of the mobile device 200 to physically connect the data port 204 of the mobile device 200 to a cradle, a dock, or a USB port located at a shopping kiosk, in a shopping cart, at a service desk, or the like.

The processor 206 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the mobile device functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 208 may be realized as RAM memory, flash memory, EPROM memory, EEPROM memory, registers, a hard disk, a removable disk, a CD-ROM, or any other form of storage medium known in the art. In this regard, the memory 208 can be coupled to the processor 206 such that the processor 206 can read information from, and write information to, the memory 208. In the alternative, the memory 208 may be integral to the processor 206. As an example, the processor 206 and the memory 208 may reside in an ASIC.

The display 210 represents the primary graphical interface of the mobile device 200. The display 210 may leverage known display technologies such as, without limitation: liquid crystal display, thin-film transistor, organic light-emitting diode, interferometric modulator display, touch screen, and/or other display technologies. The actual size, resolution, and operating specifications of the display 210 can be selected to suit the needs of the particular application. As explained in more detail below, the display 210 could be operated to present RFID tag data to the user, to display control or configuration parameters of the RFID readers 106 (see FIG. 1), or to otherwise enable the user to interact with the RFID system 100 in an appropriate manner.

The user interface 212 may include or be realized as one or more buttons, input/output elements, switches, or other features that enable the user to interact with the mobile device 200. In certain embodiments, the user interface 212 can be manipulated as needed to enable the mobile device 200 to request RFID interrogation, to control or manage the operation of the RFID readers 106, to view or process RFID tag data, and/or to otherwise interact with components, applications, or data associated with the RFID system 100.

The GPS module 214 is configured in accordance with known technologies to enable the mobile device 200 to obtain or derive geographic position data that indicates the current position of the mobile device 200. In this regard, the GPS module 214 receives GPS signals from GPS satellites and performs the required calculations and derivations to obtain geographic position data for the mobile device 200. The geographic position information produced by the GPS module 214 can be utilized by the RFID system 100 to identify RFID tags within close proximity of the mobile device 200, to selectively activate RFID readers near the mobile device 200, to filter the amount of RFID tag data delivered to the mobile device 200, and/or to locate a particular target RFID tag of interest (as described in more detail below).

One or more sensors 216 may be provided with the mobile device 200 to provide information related to orientation, heading, movement, position, and/or acceleration of the mobile device 200. Thus, the sensors 216 could be realized as one or more of the following, without limitation: an accelerometer; a gyroscopic element; a force sensor; weights; optical emitters; or the like. In practice, the mobile device 200 (or another component of the RFID system 100) can process the signals, sensor data, or electrical parameters produced by one or more of these sensors 216 to determine the position or orientation of the mobile device 200, the direction or heading in which the user is pointing the mobile device 200, etc. This additional position/orientation information can be utilized by the RFID system 100 to precisely identify an RFID tag (or tags) at which the mobile device 200 is aimed or to better define the current location of the mobile device 200.

The reference RFID tag 218 may be attached or coupled to the mobile device 200, temporarily affixed to the housing of the mobile device 200, integrated with the mobile device 200, contained within the housing of the mobile device 200, or the like. The reference RFID tag 218 may be an active tag or a passive tag, configured to function and operate in a conventional manner. In other words, the reference RFID tag 218 responds to an RFID interrogation signal by generating an appropriate RFID tag response signal. As described in more detail below, the reference RFID tag 218 can be utilized to accurately determine the position of a target RFID tag (relative to the reference RFID tag 218 and, therefore, relative to the mobile device 200) using only one RFID reader.

Figure 3:
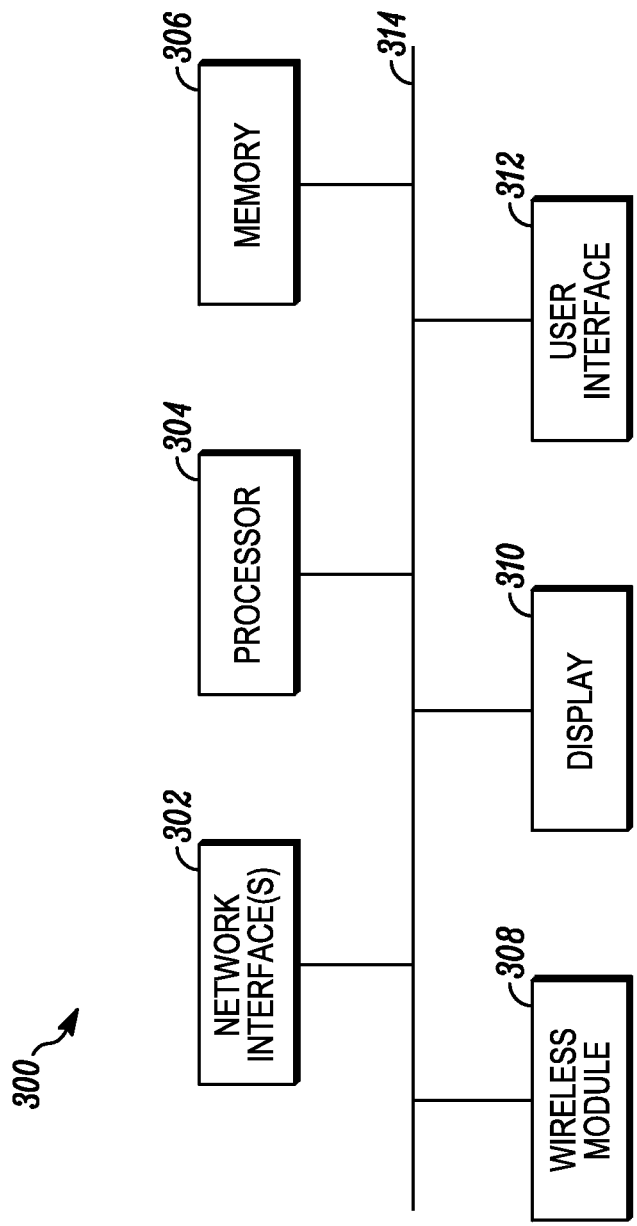
FIG. 3 is a schematic representation of an exemplary RFID system controller that is suitable for use in the RFID system depicted in FIG. 1.

FIG. 3 is a schematic representation of an exemplary RFID system controller 300 that is suitable for use in the RFID system 100 depicted in FIG. 1. Accordingly, the RFID system controller 300 may employ some or all of the generalized architecture, features, and functionality of the RFID system controller 104 (as described previously). For this example, the RFID system controller 300 generally includes, without limitation: one or more network interfaces 302; at least one processor 304; and a suitable amount of memory 306. The RFID system controller 300 may also include one or more of the following elements if so desired: a wireless module 308; a display 310; and a user interface 312. Of course, a practical implementation of the RFID system controller 300 will include other components and elements designed to carry out conventional operations that are unrelated to the described subject matter. The elements of the RFID system controller 300 are coupled together as needed by a suitably configured interconnect architecture 314 that accommodates data transfer, control/command signals, supply voltages, etc.

The network interface(s) 302 represents hardware, software, firmware, processing logic, and the like, that allows the RFID system controller 300 to support data communication using one or more data communication networks. In this regard, the network interface(s) 302 allows the RFID system controller 300 to control and manage the RFID readers 106 (see FIG. 1). Depending upon the particular embodiment, the network interface(s) 302 may also enable the RFID system controller 300 to interact with WLAN infrastructure devices, a telecommunication network, a WAN such as the Internet, a LAN, or the like. In this regard, the network interface(s) 302 enable the RFID system controller 104 to communicate with the first and second network architectures 108, 110 (see FIG. 1).

The processor 304 and the memory 306 may be generally configured as described above for their counterparts in the mobile device 200. Thus, the processor 304 will include the processing logic and intelligence needed to perform the RFID system controller functions described here, and the memory 306 can be coupled to the processor 304 such that the processor 304 can read information from, and write information to, the memory 306. In the alternative, the memory 306 may be integral to the processor 304.

The wireless module 308 may be generally configured as described above for its counterpart in the mobile device 200. The wireless module 308 supports wireless data communication operations performed by the RFID system controller 300, using one or more of the wireless data communication techniques described previously. For example, in certain embodiments the wireless module 308 could be used to support wireless communication with one or more of the RFID readers, one or more of the wireless access point devices, and/or one or more mobile devices in the RFID system. As another example, the wireless module 308 could be used to support wireless network communications using cellular or satellite network technology.

An embodiment of the RFID system controller 300 could be provided with the display 310. In practice, the display 310 can be generally configured as described above for its counterpart in the mobile device 200. The display 310 represents the primary graphical interface of the RFID system controller 300. Accordingly, the display 310 could be used to display control or configuration parameters of the RFID readers, or to otherwise enable the user to interact with the RFID system in an appropriate manner. Moreover, the display 310 could be used as a virtual display for one or more of the RFID readers in the system and/or as a virtual display for mobile devices in the system. For example, it may be convenient to display RFID tag data and/or to display the locations of the mobile devices within the RFID system.

As another option, the RFID system controller 300 could be provided with the user interface 312. In practice, the user interface 312 can be generally configured as described above for its counterpart in the mobile device 200. Thus, the user interface 312 allows the user to interact with the RFID system controller 300 as needed.

The RFID system described here provides virtual or emulated RFID services to mobile devices, which might be unable to communicate with RFID tags using the over-the-air interface. Thus, a common mobile device (e.g., a cellular smartphone or a portable computer) can obtain and/or process RFID tag data without having to generate and transmit RFID interrogation signals and without having to directly receive RFID tag response signals. As a result, the mobile device emulates the functionality of an RFID reader while remaining energy efficient.

The RFID system may be deployed in any suitable environment, such as a warehouse, a supermarket, a shopping center, or the like. Compatible mobile devices can communicate with the RFID system infrastructure or backbone in some fashion. For instance, a compatible mobile device may use WLAN, ZIGBEE, BLUETOOTH wireless data communication links and/or a wired or docked connection to communicate with the RFID system backbone. The RFID system may employ a centralized processing approach (using, for example, an RFID system controller) or a decentralized processing approach (where compatible mobile devices can communicate directly with one or more of the RFID readers in the system even though they might lack the ability to use the RFID over-the-air interface).

In a decentralized system, a compatible mobile device could be used to configure, set up, and initialize the RFID readers, issue interrogation commands to the RFID readers, and/or obtain reports or events from the RFID readers. In certain embodiments, a compatible mobile device could be used to provide a virtual user interface (display) for the RFID readers. Conversely, the native display of an RFID reader could be used to provide a virtual user interface for RFID functions of a compatible mobile device.

In a centralized system that employs an RFID system controller, a compatible mobile device may cooperate and communicate with the RFID system controller in a way that allows the mobile device to function as a virtual RFID reader even though it might lack the native ability to communicate with RFID tags using the over-the-air interface. In this regard, the mobile device can send requests for RFID operations or services to the RFID system controller, which in turn initiates appropriate actions and issues the necessary control commands to satisfy the requests. The mobile device can also receive responses, RFID tag data, and other information from the RFID system controller. In certain embodiments, the mobile device could be used to provide a virtual or remote user interface (display) for the RFID system controller. This would enable a system administrator to remotely access the RFID system controller if so desired.

In a centralized system, the RFID system controller might also function in a conventional manner and interact with the RFID readers as needed. For example, the RFID system controller can configure, set up, and initialize the RFID readers, issue interrogation commands to the RFID readers, and receive RFID tag data, reports, events, and other information from the RFID readers. Moreover, information obtained by the RFID system controller could be processed, analyzed, and/or forwarded to compatible mobile devices if so desired. In addition, the native display of the RFID system controller and/or the native display of an RFID reader could be used to provide a virtual user interface for RFID functions of a compatible mobile device.

An RFID system as described here (whether centralized or decentralized processing is employed) can feed RFID tag data or related product/item information to compatible mobile devices. In certain embodiments, the RFID system can determine the current location of a requesting mobile device and only provide information associated with RFID tags that are located within a certain distance from the mobile device. In such embodiments, the RFID system obtains the current position of the mobile device in some fashion. For example, the mobile device could determine its own position or otherwise obtain data that is indicative of its position, and then send the position data to the RFID system backbone (directly to the RFID system controller or via one or more RFID readers without relying on the RFID over-the-air interface). In this regard, the mobile device could be outfitted with proximity sensors, motion sensors, a gyroscope, an accelerometer, an infrared sensor, a camera, a GPS system, or the like. As another possibility, the RFID system could cooperate with a WLAN infrastructure that employs conventional triangulation or other location estimation techniques to determine the location of the mobile device. Moreover, WLAN infrastructure device functionality (e.g., wireless access point functionality) could be incorporated into one or more RFID readers or the RFID system controller, and such integrated RFID/WLAN components could determine the location of mobile devices without relying on a distinct and devoted WLAN architecture.

In certain implementations, the RFID system infrastructure filters RFID tag data and associated information based at least in part on the current location of the requesting mobile device. For example, although the RFID system may interrogate RFID tags throughout a store, the tag data can be filtered such that the mobile device only receives a subset of the collected tag data, namely, tag data corresponding to tags that are located in close proximity to the mobile device. Such filtering techniques can be implemented to reduce the amount of data transmitted to the mobile device, and to reduce the amount of information to be processed and rendered by the mobile device. Advanced filtering techniques could also be used to contemplate sensor data collected by the mobile device. For example, such sensor data could be processed to determine: the direction or heading in which the user is looking; the direction or heading in which the user is facing; the direction or heading in which the mobile device is pointed; the physical orientation of the mobile device; or the like. This additional orientation, heading, or position data could be used to determine whether the user is pointing the mobile device at a particular item of interest or zone of interest and, if so, to filter the interrogated tag data in an appropriate manner. Thus, if the user points the top of the mobile device at a shelf of products located only a few feet away, the RFID system could filter the interrogated tag data in an intelligent manner and only send a "focused" subset of tag data to that mobile device.

Moreover, an RFID system as described here could leverage a compatible mobile device (that may or may not lack the ability to communicate with RFID tags in the traditional sense) to accurately determine the location of an interrogated RFID tag of interest. More specifically, the mobile device is provided with a reference RFID tag, and both the tag of interest and the reference tag are interrogated by the same RFID reader. The tag response data can then be analyzed to accurately determine the location of the tag of interest relative to the location of the reference RFID tag. This location data can be used to guide the user of the mobile device to the tag of interest, to display a map with the location of the tag of interest superimposed thereon, or the like.

Figure 4:
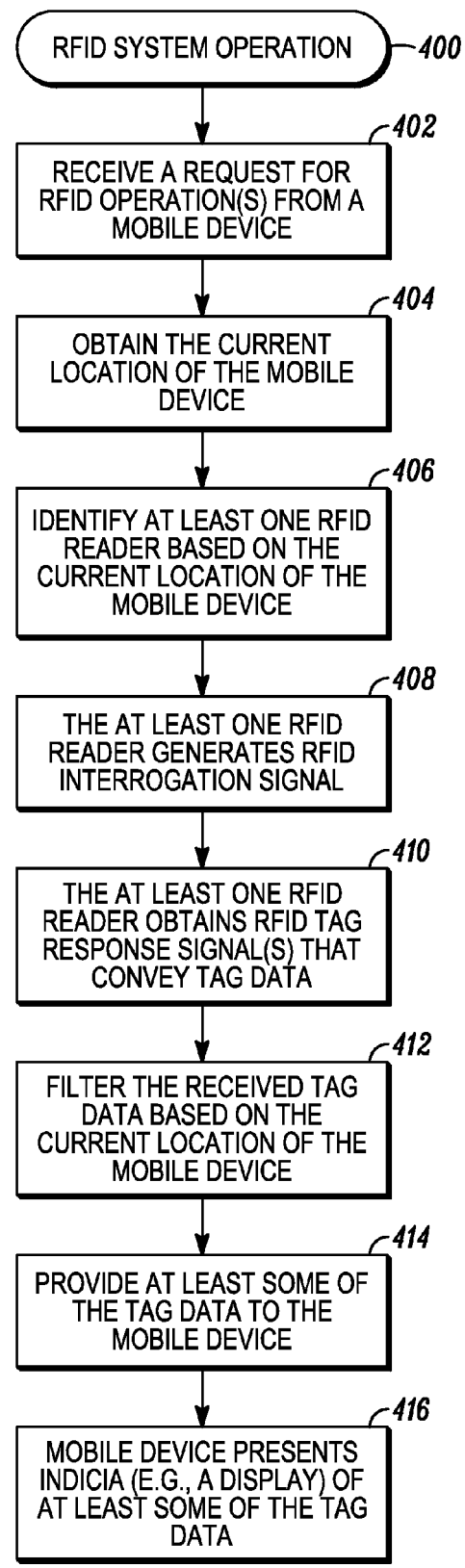
FIG. 4 is a flow chart that illustrates an exemplary method for operating an RFID system.

Turning now to the flow charts, FIG. 4 illustrates an exemplary process 100 for operating an RFID system. The various tasks performed in connection with a described process (such as the process 400) may be performed by software, hardware, firmware, or any combination thereof. For illustrative purposes, the following description of various processes may refer to elements mentioned above in connection with FIGS. 1-3. In practice, portions of a described process may be performed by different elements of the described RFID system, e.g., a mobile device, an RFID reader, an RFID system controller, or functional modules thereof. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in connection with a described process could be omitted from an embodiment of the respective process as long as the intended overall functionality remains intact.

The process 100 will be described in the context of an RFID system that includes an RFID system controller to carry out centralized processing. It should be appreciated that the process 400 could be performed in an equivalent manner by an RFID system that employs decentralized processing. The illustrated embodiment of the process 400 begins by receiving a request from a mobile device (task 402). In certain scenarios, the mobile device lacks the ability to communicate directly with RFID tags in the traditional sense. In practice, this request can be generated and issued by the mobile device, and received (directly or indirectly) by the RFID system controller. The request may be a request to interrogate one or more RFID tags, a request to locate a particular item of interest having a target RFID tag associated therewith, a request for RFID system data, or the like. This particular example assumes that the request corresponds to an interrogation or scan request that originates from the mobile device.

The process 400 may also obtain the current location or position of the requesting mobile device (task 404) using one or more of the techniques, technologies, or methodologies described herein. In this regard, the RFID system controller may obtain the current location of the mobile device directly or indirectly from the mobile device, or from another component in the RFID system. For example, the RFID system controller could receive self-position data from the mobile device, where the self-position data indicates the location or geographic position of the mobile device relative to any reference or coordinate system understood by the RFID system. In this regard, the self-position data might indicate or be associated with the UPS coordinates of the mobile device, or it might indicate or be associated with the location of the mobile device relative to one or more reference points (such as RFID readers, wireless access point devices, a docking station, or the like). As another example, the self-position data might include or be associated with a picture of the surrounding environment, as captured by the mobile device. The content of the picture could be analyzed using image analysis techniques to ascertain the current location of the mobile device. Alternatively, the RFID system controller could derive or otherwise calculate the current location of the mobile device from "raw" data provided by the mobile device and/or data provided by one or more other components in the RFID system. As yet another example, the location of the mobile device could be determined using network access information. In this regard, if the mobile device is communicating through a fixed wireless access point, the location of the access point is preconfigured and known, hence, the location of the mobile device can be determined or estimated because it will be in the operating range of that particular wireless access point. Accordingly, RFID readers near the known location of that wireless access point can be commanded to interrogate RFID tags as needed.

The RFID system can process the current location of the mobile device in a number of different ways to support a variety of operations and features. For example, the illustrated embodiment of the process 400 identifies at least one RFID reader (from a plurality of available RFID readers in the RFID system) based on the current location of the mobile device (task 406). This feature assumes that the user of the mobile device is interested in RFID tag information for products or items in close proximity to the mobile device. Operating under this assumption can be desirable to conserve energy, to reduce the amount of collected tag data, and to reduce the amount of processing required to analyze, transmit, and display the desired tag data. It should be appreciated that task 406 is optional, and that the RFID system could instead identify and activate all of the RFID readers under its control, if so desired.

The process 400 may then continue by generating an RFID interrogation signal (or signals) with at least one RFID reader of the RFID system (task 408). For this example, the RFID interrogation signal is generated by an RFID reader identified during task 406. In other words, the RFID reader interrogates the RFID tags within its respective interrogation range. In response to the interrogation, the RFID reader obtains at least one RFID tag response signal that conveys tag data (task 410). As is well understood, an RFID tag within the interrogation range of the RFID reader will react to the interrogation signal, and the resulting tag response signal can be detected by the interrogating RFID reader. Accordingly, the RFID reader may obtain a plurality of different tag response signals in response to a single interrogation signal. Moreover, it should be appreciated that the process 400 could obtain tag data at multiple RFID readers, each interrogating its own zone.

Figure 5:
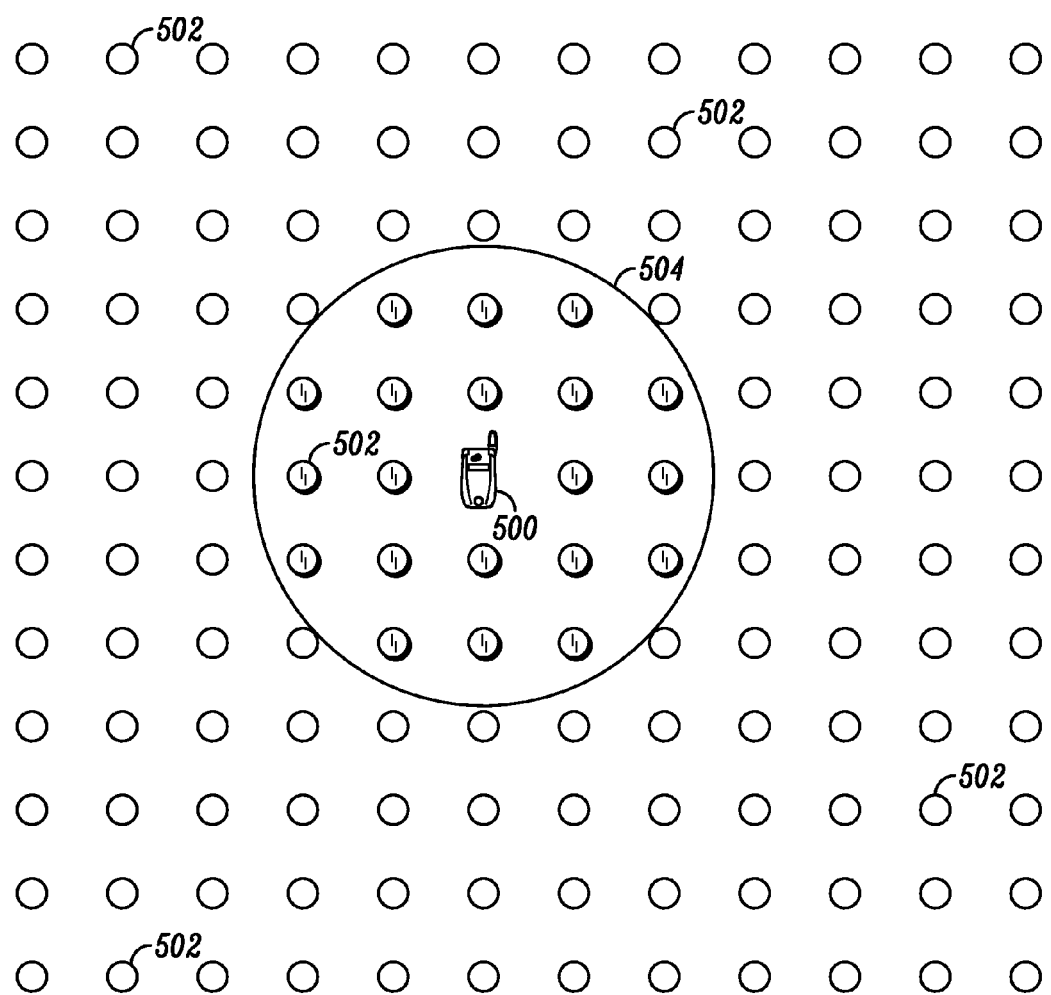
FIG. 5 is a diagram that shows a mobile device and RFID tags in close proximity to the mobile device.

The process 100 may continue by processing the received tag response signals and/or the tag data conveyed in the tag response signals in an appropriate manner. For instance, the RFID system controller could filter some or all of the received tag data based on the current location of the mobile device (task 412). In this regard, the tag data can be filtered in accordance with the location of the RFID tags relative to the current location of the mobile device. For example, it may be desirable to generate filtered tag data that corresponds to RFID tags that are located within a specified distance from the mobile device. FIG. 5 is a diagram that shows a mobile device 500 and RFID tags 502 in close proximity to the mobile device 500. For this example, the RFID system controller obtains tag data for all of the RFID tags 502 shown in FIG. 5. However, the set of tag data can be filtered based on distance (e.g., a radius) from the current location of the mobile device 500. FIG. 5 depicts an area 504 that corresponds to a filtering criteria applied to the set of tag data. Thus, the filtered tag data will only include tag data corresponding to those RFID tags 502 that are located within or near to the area 504 (these tags are shaded in FIG. 5). As depicted in FIG. 5, the filtered tag data represents a proper subset of the entire set of tag data that is originally collected by the RFID system controller. It should be appreciated that FIG. 5 depicts a simple scenario where the area 504 is circular (or spherical) in shape. In practice, the filtering criteria need not be so simple, and the filtered tag data can be determined based on any formula, algorithm, or the like.

Referring back to FIG. 4, the process 400 can proceed by providing at least some of the collected tag data (and/or information associated with such tag data) to the mobile device (task 414). For this particular example, the process 400 sends the filtered tag data to the mobile device, without sending any of the remaining tag data. Depending upon the particular embodiment and system deployment, the tag data can be sent to the mobile device using one or more techniques and technologies, and using one or more data communication links. For example, the tag data could be sent from the RFID system controller to the mobile device using the on-site network architecture and possibly a tangible data communication interface such as a physical cable, a docking station, or a network port. Alternatively, the tag data could be wirelessly transmitted from the RFID system controller to the mobile device using one or more non-RFID wireless data communication links. In yet other embodiments, the RFID system controller could manage the wireless transmission of the tag data from a WLAN infrastructure device (such as an access point device) to the mobile device. In certain embodiments, the RFID system controller could send the tag data to an appropriate data communication network for routing, transmission, or delivery to the mobile device in accordance with one or more network transmission schemes. Accordingly, the tag data could be sent to the mobile device using one or more of: a cellular communication network; a satellite communication network; a WAN such as the Internet; a LAN; or the like.

This description assumes that the mobile device receives at least some of the tag data that was sent from the RFID system backbone. Accordingly, the mobile device can present indicia of the received tag data to the user in an appropriate manner and an appropriate format (task 416). For example, the mobile device could display information corresponding to the tag data on its display element, generate audio that describes or represents the tag data, render a map, a store layout, or any navigation aid that indicates the location of the mobile device and/or the location of the tag(s) of interest, etc. In practice, the mobile device could be suitably configured to process, analyze, and present the received tag data in a manner that emulates the functionality of conventional RFID readers, using its native display, graphics, and user interface features.

Figure 6:
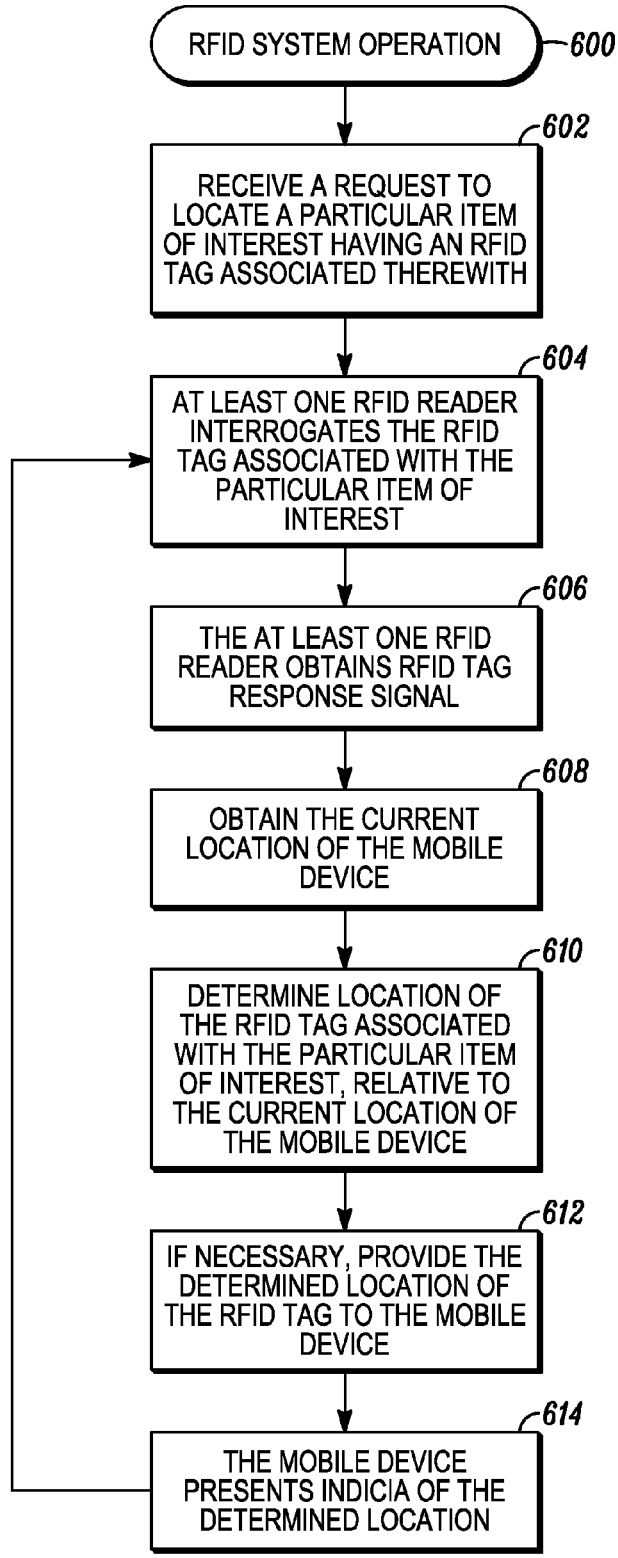
FIG. 6 is a flow chart that illustrates an exemplary method for operating an RFID system.

FIG. 6 is a flow chart that illustrates another exemplary process 600 for operating an RFID system. The process 600 will be described in the context of an RFID system that includes an RFID system controller to carry out centralized processing. It should be appreciated that the process 600 could be performed in an equivalent manner by an RFID system that employs decentralized processing. Moreover, some of the tasks and operations associated with the process 600 are similar or identical to counterpart tasks and operations described above for the process 400; such common tasks and common aspects will not be redundantly described in detail here.

The illustrated embodiment of the process 600 begins by receiving a request from a mobile device (task 602). In certain scenarios, the mobile device lacks the ability to communicate directly with RFID tags in the traditional sense. In practice, this request can be generated and issued by the mobile device, and received (directly or indirectly) by the RFID system controller. The request may be a request to locate or find a particular item of interest having a target RFID tag associated therewith. Assume, for example, that a user of the mobile device is searching for a specific product in a supermarket, such as a specific box of cereal. Assume further that the box of cereal has an RFID tag associated therewith. The user could access a product list (which may be available online or provided by the supermarket), select or otherwise indicate the box of cereal, and issue a request to locate that box of cereal. For this example, the request also identifies or otherwise indicates the reference RFID tag that is attached to it.

In response to receiving the request, the RFID system controller activates at least one RFID reader in the system, and the RFID reader interrogates the target RFID tag that is associated with the requested item of interest (task 604), and obtains an RFID tag response signal from the target RFID tag (task 606). In practice, the RFID reader may also receive additional RFID tag response signals corresponding to other RFID tags within the interrogation zone. Indeed, the different tag response signals and the tag data conveyed in the received tag response signals can be processed and otherwise handled in the manner described above with reference to tasks 412, 414, and 416 of the process 400.

The process 600 may also obtain the current location or position of the requesting mobile device (task 608) using one or more of the techniques, technologies, or methodologies described previously. In addition, the process 600 determines the location of the target RFID tag, relative to the current location of the mobile device (task 610). Depending upon the embodiment, task 610 could be performed by the RFID system controller, by one or more interrogating RFID readers, by one or more wireless access point devices, and/or by the mobile device. Moreover, task 610 may utilize any suitable technique, algorithm, or methodology to determine the location of the target RFID tag relative to the mobile device. For example, interrogation by two or more RFID readers (or two or more wireless access points) could be used to obtain data for purposes of triangulation-based location calculations. As another example, only one RFID reader (e.g., the reader that interrogates the target RFID tag) could be employed to determine the location of the target RFID tag, as described in more detail below with reference to FIG. 7.

If necessary, the determined location of the target RFID tag is provided, sent, or transmitted to the mobile device (task 612). For example, if the RFID system controller determines the location of the target RFID tag, then it can provide the determined location to the mobile device, directly or indirectly, and using one or more wireless and/or non-wireless data communication links. As another example, if a wireless access point device calculates the location of the target RFID tag, then it could send the determined location to the mobile device using WLAN technology.

This description assumes that the mobile device receives and processes the determined location of the target RFID tag. Accordingly, the mobile device can present indicia of the determined location to the user in an appropriate manner and using an appropriate format (task 614). For example, the mobile device could display one icon that represents the location of the target RFID tag, another icon that represents the location of the mobile device itself, and navigation or guidance information intended to lead the user to the target RFID tag. In this regard, the mobile device could render a map, a store layout, or any navigation aid that indicates the location of the mobile device and/or the location of the target RFID tag.

The majority of the process 600 can be repeated as needed to refresh the location data and to update the display of the mobile device. In this regard, if it is time to refresh the data or update the display, then the process 600 can be re-entered at task 604. Repeated interrogation of the target RFID tag is desirable in certain systems that might utilize mobile RFID readers, and to support the tag locating process described below with reference to FIG. 7. Thus, the process 600 can update the display of the mobile device as the user moves around in the RFID system environment, and the dynamic display will graphically indicate the location of the target RFID tag relative to the current position of the mobile device in an ongoing manner.

In certain situations it may be desirable to accurately locate an RFID tag of interest. Indeed, task 610 of the process 600 described above is associated with the determination of the location of a target RFID tag. Moreover, there is an interest in creating the ability to locate specific tags using a non-RFID mobile device with the help of another reader, typically a fixed RFID reader. The fixed RFID reader, which might be located in a warehouse, could be used to interrogate and read specific tags but, due to its size and functionality, it is immobile for all practical purposes and to search for a specific tag among a group of tags becomes difficult. Additional difficulty arises when the tags are mobile. For example, certain products such as items of clothing may move from a display rack, to a dressing room, and to a different rack.

Hence, to locate a target RFID tag associated with a product or any item of interest, a handheld RFID reader device can be used. Such handheld reader devices may employ an audible tone or alert such as a "beep-to-the-box" indicator that allows the user to be led to a specific tag by providing audio and/or visual cues as the user moves around the environment. Alternatively, a minimum of two RFID readers must be used to identify the location of a tag using conventional triangulation methods. However, it would be desirable to be able to locate an item of interest without having to actually walk around with a handheld RFID reader and to avoid the use of two RFID readers for triangulation. The requirement of two RFID readers is troublesome when only one RFID reader is deployed at a location.

The tag locating approach described here locates a target RFID tag using a mobile device that is unable to communicate with RFID tags using the traditional RFID over-the-air interface; the mobile device is deployed within the reading range of at least one RFID reader. The RFID reader and/or the mobile device will be equipped with the appropriate tag locating processing intelligence (RFID tag triangulation or any other suitable technique). Moreover, the mobile device has the ability to communicate with the RFID reader or readers (using WLAN, Bluetooth or any other non-RFID communication media) that read the target RFID tag. In this regard, the mobile device can identify and establish communication with one of the RFID readers that can actually read the tag. Notably, the mobile device has a reference RFID tag attached thereto or incorporated therein. The RFID reader can process the tag data obtained from the target RFID tag and the reference RFID tag to determine the location of the target RFID tag relative to the reference RFID tag. It should be appreciated that other electronic distance measurement techniques (such as GPS) could be leveraged if so desired.

In certain implementations, the RFID reader is implemented with software (algorithms) and hardware (antenna rotation and sensing mechanisms) to identify the distance and direction of the target RFID tag. The distance measurement between the RFID reader and the target RFID tag can be accomplished by one of a number of different methods, or a combination thereof. For instance, the system could employ RSSI (Received Signal Strength Indication), Time-of-Arrival, Time-Difference-of-Arrival, frequency domain techniques, such as phase-frequency ($d\phi/df$), and OFDM methods. These methods for distance measurements are well known, and will not be described in detail here.

The RFID reader is also capable of measuring the direction (angle of separation) of a tag from a reference point. This could be achieved with the help of highly directional antennas and scanning by antenna rotation (e.g., using a stepper motor) and/or by using rotation sensors (e.g., gyroscope, stepper motor steps, or some other rotation sensing devices). The RFID reader starts scanning from a reference point and searches for a particular tag and then measures minimum distance (maximum RSSI) to identify the direction of the tag. This is one suitable technique for accurately measuring tag direction relative to a reference point.

The tag locating approach described here employs an RFID reader with a known location and having the ability to measure the angular displacement between two RFID tags in its interrogation field. This can be accomplished with any conventional methodology. Assuming, for example, that the RFID reader is a fixed reader (which is the case for many warehouse and commercial deployments), it is possible to provide the RFID antenna with an electronic sensor to measure its angular displacement, along with a drive mechanism to rotate the antenna to the desired direction. For this embodiment, the RFID antenna is assumed to be a directional antenna. The tag locating approach presented here also utilizes a non-RFID mobile device of the type described above, namely, one that is unable to communicate with RFID tags using the traditional over-the-air interface. However, as shown in FIG. 2, the non-RFID mobile device is provisioned with a reference RFID tag that can be used to locate a target RFID tag.

Figure 7:
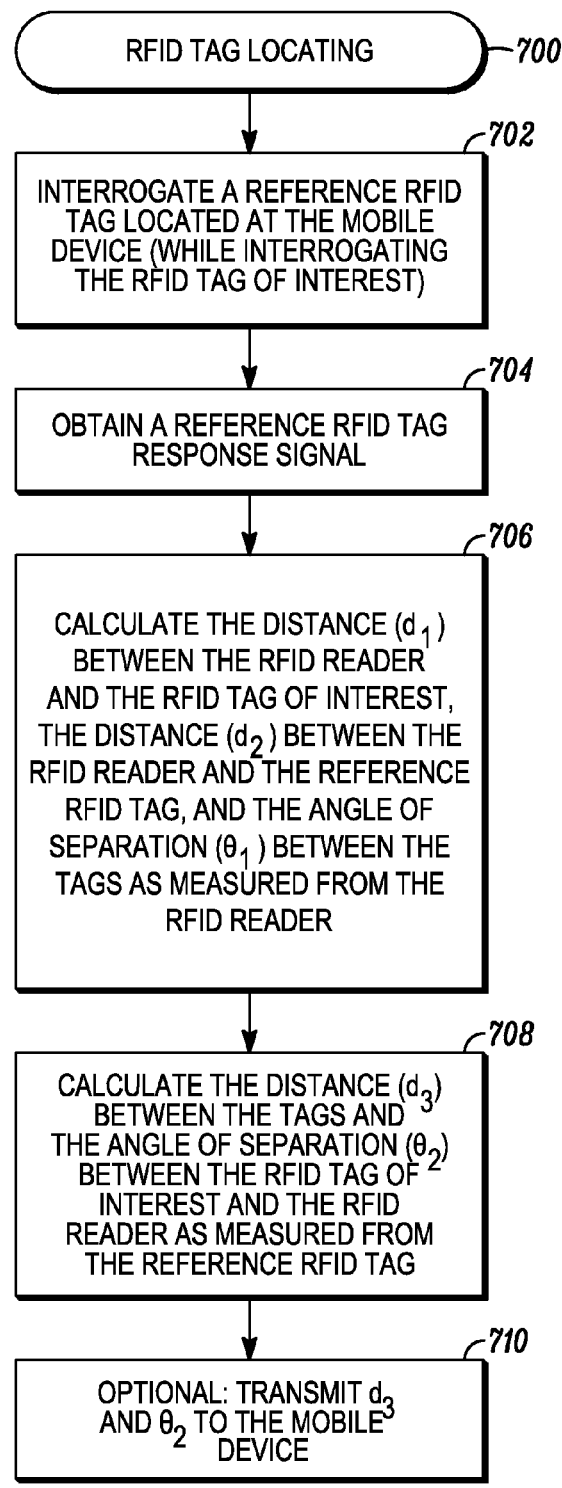
FIG. 7 is a flow chart that illustrates an exemplary method for locating an RFID tag.

FIG. 7 is a flow chart that illustrates an exemplary process 700 for locating an RFID tag in accordance with the approach presented above. Again, the process 700 may be performed in association with task 610 of the process 600. The process 700 may be initiated in response to a request to locate a particular RFID tag of interest, as mentioned above for the process 600.

Figure 8:
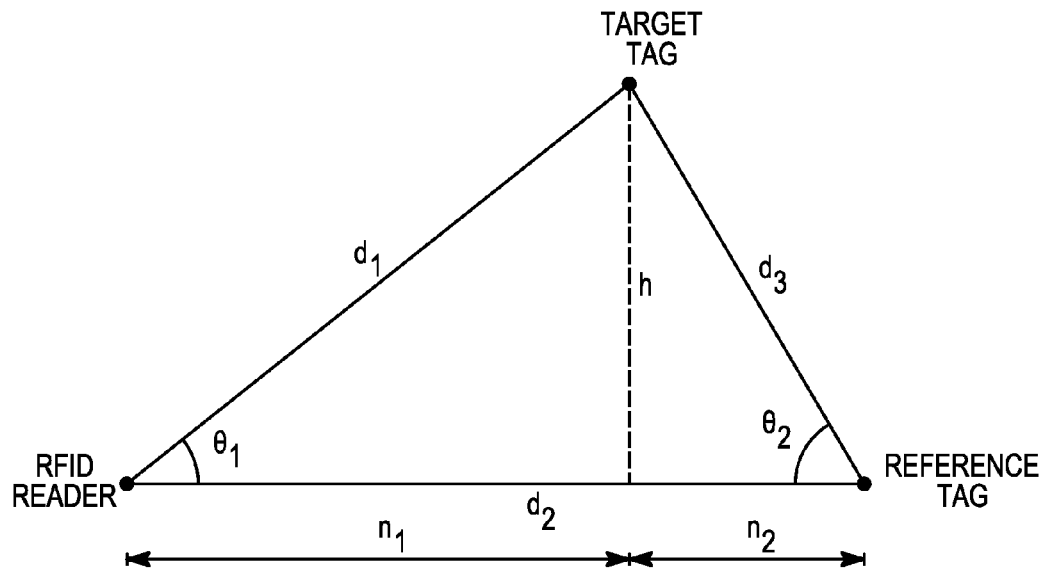
FIG. 8 is a diagram that shows various distance and angle relationships for an RFID reader, a target RFID tag, and a reference RFID tag.

The process 700 interrogates the target RFID tag and the reference RFID tag (located at the mobile device) with the designated RFID reader (task 702) to obtain respective RFID tag response signals. In this regard, the RFID reader will obtain one or more tag response signals corresponding to the target RFID tag, and one or more tag response signals corresponding to the reference RFID tag (task 704). Note that there could be multiple signals/responses, in accordance with the underlying RFID protocols. These tag response signals can be analyzed and processed as needed to calculate, derive, or otherwise obtain certain measurements and parameters related to the location of the target RFID tag and the location of the reference RFID tag. These measurements and parameters will be discussed below with reference to FIG. 8, which is a diagram that shows various distance and angle relationships for an RFID reader, a target RFID tag, and a reference RFID tag.

For this particular example, the process 700 may obtain or calculate (task 706): the distance ($d_1$) between the RFID reader and the target RFID tag; the distance ($d_2$) between the RFID reader and the reference RFID tag; and the angle of separation ($\theta_1$) between the target RFID tag and the reference RFID tag, as measured from the RFID reader. In practice, the RFID reader can measure the distance $d_1$ by reading the target RFID tag, and mark the direction (i.e., the angle $\theta_1$). Similarly, the RFID reader can measure the distance $d_2$ by reading the reference RFID tag. This information can be used to calculate the position of the target RFID tag relative to the reference RFID tag. In this regard, the position of the target RFID tag is calculated based on (or otherwise in response to) the RFID tag response signals received from the target RFID tag and the reference RFID tag.

For this example, the process 700 calculates or otherwise obtains (task 708) the distance ($d_3$) between the target RFID tag and the reference RFID tag, along with the angle of separation ($\theta_2$) between the target RFID tag and the RFID reader, as measured from the reference RFID tag. In certain embodiments, task 706 and task 708 are performed by the RFID reader and, thereafter, the distance $d_3$ and the angle of separation $\theta_2$ are transmitted to the mobile device (task 710) using a data communication path that does not rely on the RFID over-the-air interface. Thereafter, the mobile device can process these quantities in an appropriate manner to generate a display or other indication of the determined location (as described above for task 614 of the process 600). In other embodiments, task 708 could be performed by the mobile device if the values of $d_1$, $d_2$, and $\theta_1$ are sent to the mobile device.

Referring again to FIG. 8, the RFID reader determines the distance $d_1$ of the target RFID tag and marks the direction of the target RFID tag as a reference point. The distance measurement for the reference RFID tag attached to the mobile device, relative to the RFID reader, is indicated by $d_2$. This distance is measured after the antenna (or the RFID reader) is rotated to identify the maximum signal strength obtained for the reference RFID tag. The angle of separation $\theta_1$ can be measured using any suitable methodology or technology, such as a gyroscope, an amount of rotation or by any other electronic rotation sensing device. This example assumes that the RFID reader emits a beam in one direction and has a highly directional antenna, hence the direction of tags provides the angle of separation, and the measurements are well determined. More measurements can be performed at different locations if so desired to provide additional information to help obtain a more accurate location of the target RFID tag. After the distances $d_1$ and $d_2$ are known, the location of the target RFID tag can be easily determined using basic trigonometry. As a particular example, one can determine the angle of separation $\theta_2$ and the distance $d_3$ using the following equations:

$$d_3 = \sqrt{h^2 + n_2^2}, \text{ where } h = d_1 \sin \theta_1$$

$$n_2 = d_2 - n_1, \text{ where } n_1 = d_1 \cos \theta_1$$

With the distances h, $n_2$, and $d_3$ known, the separation angle $\theta_2$ can be determined as follows:

$$\theta_2 = \cos^{-1}(n_2/d_3) \text{ or } \theta_2 = \sin^{-1}(h/d_3)$$

In summary, the above equations (which are merely illustrative and are not meant to be limiting or exhaustive) provide the relative location of the target RFID tag with respect to the reference RFID tag and, therefore, relative to the mobile device that is co-located with the reference RFID tag. Hence, with the help of a single RFID reader and a reference RFID tag, any mobile device that has the ability to communicate with the RFID reader (via Bluetooth, WLAN, or any other means) could be used to locate a target RFID tag of interest using straightforward triangulation techniques.

The tag locating process 700 could be modified to locate specific RFID tags using a mobile or handheld RFID reader and another RFID reader, typically a fixed RFID reader. For example, fixed RFID readers in a warehouse could read specific tags, but the accuracy of location information of the tags would be restricted to the full reading range of the fixed readers. Identifying the location of a particular tag that in the reading range of only one reader thus becomes difficult because that reader can only determine the range or distance to the read tag, but not the location of the read tag. Similarly, a mobile RFID reader by itself can provide the range or distance to a read tag, but not the specific location of that tag.

As described above with reference to FIG. 7 and FIG. 8, an exemplary tag locating technique employs a fixed RFID reader and a mobile device having a reference RFID tag attached to it or otherwise co-located with it. In contrast, the alternate approach described here employs a first RFID reader (which may be fixed or mobile, but for this example is a fixed reader) and a second RFID reader, which is a mobile reader. Moreover, the alternate approach employs a reference RFID tag attached to or otherwise co-located with the first RFID reader. In this regard, FIG. 9 is a diagram that shows various distance and angle relationships for the fixed RFID reader (and the reference RFID tag), a target RFID tag, and a mobile RFID reader.

For this example, the mobile RFID reader is within the reading range of the fixed RFID reader, and the fixed RFID reader is equipped with a suitable locationing technology (e.g., GPS, RFID tag triangulation as described here, or the like). Moreover, the mobile RFID reader has the ability to communicate with the fixed RFID reader (and other readers in the system that read the target RFID tag) using WLAN, Bluetooth, or any other non-RFID communication media. Notably, the reference RFID tag that is co-located with the fixed RFID reader can be read by the mobile RFID reader. This enables the mobile RFID reader to process the tag data obtained from the target RFID tag and the reference RFID tag to determine the location of the target RFID in a manner similar to that described previously for the process 700.

Figure 9:
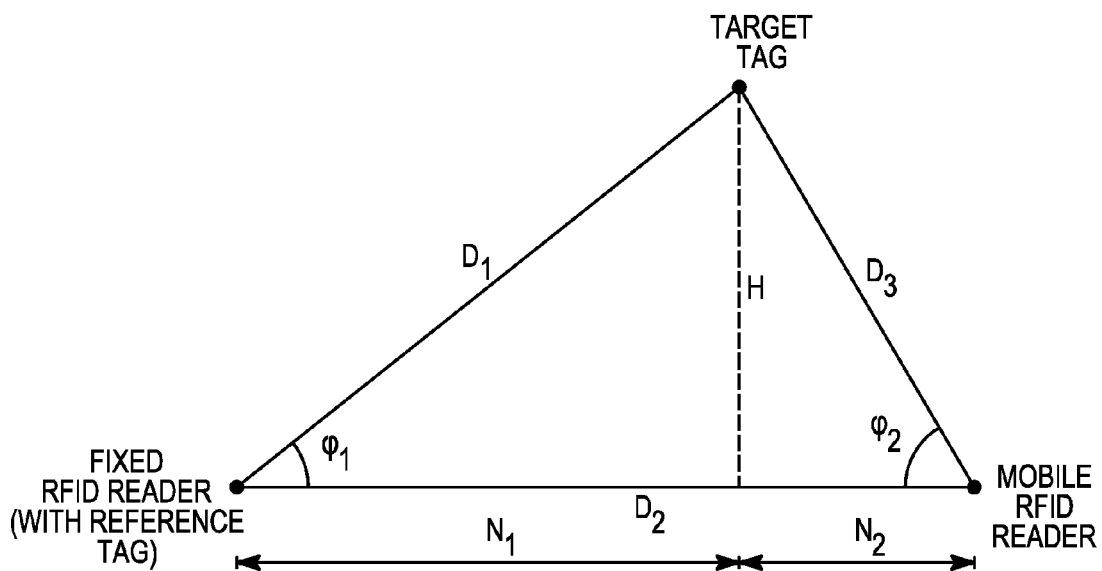
FIG. 9 is a diagram that shows various distance and angle relationships for a fixed RFID reader, a target RFID tag, and a mobile RFID reader.

Referring to FIG. 9, the location of the target tag can be determined using the following methodology. The mobile RFID reader measures or otherwise determines the distance $D_2$ to the fixed RFID reader by reading the reference RFID tag that is co-located with the fixed RFID reader, and by using one of the available distance calculating techniques described above. Similarly, the mobile RFID reader measures or otherwise determines the distance $D_3$ to the target RFID tag. The fixed RFID reader also interrogates the target RFID tag to determine the distance $D_1$ between the fixed RFID reader and the target RFID tag. The mobile RFID reader can then obtain the distance $D_1$ from the fixed RFID reader using one or more appropriate data communication links between the fixed RFID reader and the mobile RFID reader.

The mobile RFID reader can then calculate the location of the target RFID tag, using the distances $D_1$, $D_2$, and $D_3$, along with basic trigonometric relationships and formulas. As one particular non-limiting example, the mobile RFID reader can calculate the angles subtended between the target RFID tag and the line formed between the fixed RFID reader and the mobile RFID reader and, in turn, calculate the distance H in the following manner:

$$H = \frac{D_2}{\frac{1}{\tan\varphi_1} + \frac{1}{\tan\varphi_2}}$$

The angles $\phi_1$ and $\phi_2$ can also be calculated as follows:

$$\varphi_1 = \cos^{-1}\frac{N_1}{D_1}$$

$$\varphi_2 = \cos^{-1}\frac{N_2}{D_3}$$

For the above relationships, the distances $N_1$ and $N_2$ can be calculated using basic and well known trigonometry, e.g., the Pythagorean Theorem.

Using this alternate approach, a mobile RFID reader can be used to locate a target RFID tag using triangulation techniques with the help of a second RFID reader (fixed or mobile), where the distance between the two readers can be dynamically calculated with the help of a reference RFID tag attached or otherwise co-located with the second RFID reader. The RFID readers can employ any other means of locationing, such as GPS, to indicate their locations to other RFID readers.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a radio frequency identification (RFID) system, the method comprising:
    generating an RFID interrogation signal with an RFID reader of the RFID system;
    obtaining, in response to generating the RFID interrogation signal, at least one RFID tag response signal at the RFID reader, the at least one RFID tag response signal conveying tag data, and being received through a first network at a stationary controller; and
    providing at least some of the tag data to a mobile device through a second network;
    receiving, from the mobile device, a request to locate a particular item of interest having a target RFID tag associated therewith, wherein the at least one RFID tag response signal conveys tag data for the particular item of interest;
    determining a location of the target RFID tag relative to the mobile device; and
    presenting indicia of the determined location of the target RFID tag at the mobile device;
    interrogating the target RFID tag to obtain a first tag response signal, wherein the RFID reader interrogates the target RFID tag;
    interrogating a reference RFID tag located at the mobile device to obtain a second tag response signal, wherein the RFID reader interrogates the reference RFID tag; and
    calculating a position of the target RFID tag relative to the reference RFID tag, wherein the position is calculated based on the first and second tag response signals.

2. The method of claim 1, wherein the mobile device is unable to interrogate RFID tags using an RFID over-the-air interface.

3. The method of claim 1, wherein the mobile device is unable to receive RFID tag response signals using an RFID over-the-air interface.

4. The method of claim 1, wherein the providing step comprises sending at least some of the tag data from an RFID system controller of the RFID system.

5. The method of claim 1, wherein the providing step comprises wirelessly transmitting at least some of the tag data from a wireless local area network infrastructure device to the mobile device.

6. The method of claim 1, wherein the providing step comprises sending at least some of the tag data to a data communication network for routing to the mobile device.

7. The method of claim 1, further comprising presenting indicia of at least some of the tag data at the mobile device.

8. The method of claim 1, further comprising:
    obtaining a current location of the mobile device; and
    filtering the tag data based on the current location of the mobile device to obtain filtered tag data, wherein the at least some of the tag data corresponds to the filtered tag data.

9. The method of claim 1, wherein the calculating step calculates a distance between the target RFID tag and the reference RFID tag.

10. The method of claim 1, wherein the calculating step calculates an angle of separation between the target RFID tag and the RFID reader, as measured from the reference RFID tag.

11. The method of claim 1, further comprising:
    obtaining a current location of the mobile device; and
    identifying the RFID reader from a plurality of RFID readers in the RFID system, based on the current location of the mobile device.

12. A method of operating a radio frequency identification (RFID) system, the method comprising:
  receiving a request through a first network to locate a particular item of interest having a target RFID tag associated therewith, the request originating at a mobile device;
  in response to receiving the request, interrogating the target RFID tag with an RFID reader of the RFID system to obtain an RFID tag response signal through a second network from the target RFID tag;
  obtaining a current location of the mobile device; and
  determining a location of the target RFID tag relative to the current location of the mobile device;
  interrogating the target RFID tag with the RFID reader to obtain a first tag response signal;
  interrogating a reference RFID tag located at the mobile device to obtain a second tag response signal, wherein the RFID reader interrogates the reference RFID tag; and
  calculating a position of the target RFID tag relative to the reference RFID tag, wherein the position is calculated based on the first and second tag response signals.

13. The method of claim 12, further comprising providing the determined location of the target RFID tag to the mobile device.

14. The method of claim 12, wherein obtaining the current location of the mobile device comprises receiving current self-position data from the mobile device.

15. A method of operating a radio frequency identification (RFID) system, the method comprising:
  receiving a request through a first network to locate a particular item of interest having a target RFID tag associated therewith, the request originating at a mobile device;
  in response to receiving the request, interrogating the target RFID tag with an RFID reader of the RFID system to obtain an RFID tag response signal through a second network from the target RFID tag;
  obtaining a current location of the mobile device; and
  determining a location of the target RFID tag relative to the current location of the mobile device; wherein determining the location of the target RFID tag comprises:
  interrogating the target RFID tag with a first RFID reader of the RFID system to obtain a first tag response signal;
  interrogating a reference RFID tag located at a second RFID reader of the RFID system to obtain a second tag response signal, wherein the first RFID reader interrogates the reference RFID tag;
  obtaining, at the first RFID reader, a distance between the target RFID tag and the second RFID reader, wherein the distance is determined in response to the second RFID reader interrogating the target RFID tag; and
  calculating a location of the target RFID tag based on the first tag response signal, the second tag response signal, and the obtained distance.

* * * * *